July 15, 1969     B. R. FIELD     3,455,739
ELECTRIC STORAGE BATTERIES
Filed May 21, 1964     3 Sheets-Sheet 1

INVENTOR
BRAHAM R. FIELD.

ATTORNEYS

July 15, 1969     B. R. FIELD     3,455,739
ELECTRIC STORAGE BATTERIES

Filed May 21, 1964     3 Sheets-Sheet 3

INVENTOR
BRAHAM R. FIELD.

BY Watson, Cole, Grindle & Watson
ATTORNEYS

United States Patent Office 3,455,739
Patented July 15, 1969

1

3,455,739
ELECTRIC STORAGE BATTERIES
Braham Rowley Field, Redditch, England, assignor to Alkaline Batteries Limited, Redditch, England, a company of Great Britain
Filed May 21, 1964, Ser. No. 369,103
Claims priority, application Great Britain, May 22, 1963, 20,490/63
Int. Cl. H01m 43/00, 3/04
U.S. Cl. 136—6                                       15 Claims This invention relates to electric storage cells of alkaline type having a gas-tight casing, and is concerned with the problem of preventing liberation of gases or absorbing gases liberated during the operation of the cell so as to prevent build up of gas pressure which could damage or even burst the cell.

The term gas-tight is used herein in its normal sense as indicating that during normal use, both when charging and discharging, the cell has no venting means for the release of gas at atmospheric pressure. The term is not intended to exclude the provision of a safety valve or other safety device which operates only in emergency. Nor is it intended to exclude a cell that is closed by a removable gas-tight plug or stopper, although normally a gas-tight cell would be sealed at the factory and intended to remain sealed throughout its life.

According to the present invention an electric storage cell of alkaline type having a gas-tight casing, in which the plates of opposite polarity are separated by absorbent gas-permeable separating material and the amount of electrolyte is insufficient to flood the cell, is characterised in that certain of the plates have in them openings or recesses in their surface to form gas cavities, each of which is bounded partly by separator material and partly by a part of the surface of one of the plates. Conveniently the gas cavities are formed by providing recesses or openings in the positive plates.

The separator material may be wholly or partly drawn into a recess or opening in a plate so that the cavity formed thereby is exposed wholly or partly to the plate of opposite polarity. For example where the cavity is formed by an opening extending completely through a plate, say a positive plate, the layers of separating material on opposite sides of the opening may be stitched together, thereby drawing them into the opening and forming cavities which are wholly or partly exposed to the adjacent negative plates. Both arrangements, that is to say with the cavities exposed to the positive plates and with them exposed to the negative plates, have been found to be effective.

The invention is primarily concerned with cells in which the amount of electrolyte is no more than can be absorbed and held in the pores of the plates and the absorbent gas-permeable separating material between them. In such cells it is normally desirable to use quite thin separating material, and it is usual to go to some trouble to ensure that the separating material is in contact with the plates over their whole area, in order to reduce to a minimum the internal resistance of the cell and to obtain the maximum conductivity. In such constructions the separator material would not be thick enough to provide the space within its thickness for gas cavities in accordance with the present invention.

Thus the invention is not to be confused with flooded cells having ribbed or corrugated separators affording substantial spaces between them and the plates. On the one hand such spaces are immediately filled with liquid, and on the other hand if such a cell were drained of unabsorbed liquid it would have little or no conductivity.

Thus in applying the present invention the recesses or openings are preferably so formed as to leave at least

2

80% of the area of each electrode system still in contact with the moist separating material.

The invention is applicable to cells having plates of various types, for example pocket type plates, sintered plates, and plates formed from wound electrodes, including plates intended for use in button cells, in cylindrical cells, and in all the larger conventional types of nickel-cadmium alkaline accumulator cells including tubular cells of the Edison type.

The invention is primarily applicable to alkaline cells of the nickel cadmium type but may find application to other types also.

If desired the negative electrode system may have a greater charging capacity in ampere hours than the positive system.

As is known there are two conditions in which gases are evolved in a nickel cadmium cell, namely overcharging, that is to say when the cell is fully charged but a charging current continues to flow, and reversal, that is to say when the cell is fully discharged but a discharging current continues to flow so as to charge it in the opposite direction. The latter condition normally occurs in a multi-cell battery when the cells are not precisely equal and a current continues to flow through whichever cell is first discharged, due to the charge remaining in the other cells.

The build-up of pressure due to evolution of gases during charging and overcharging can be restricted by limiting the electrolyte content of each cell and by adjusting the ratio of the electro-chemical capacity of the negative active material to that of the positive active material. To this end, firstly the amount of electrolyte is limited to the amount that will be absorbed within the pores of the electrodes themselves and within the separators of porous material them. This amount of electrolyte is sufficient to ensure the necessary transfer of ions between the electrodes, while at the same time making sufficient areas of the active surfaces of the electrodes available for combination with the evolved gases. However, oxygen gas, as liberated at the positive electrode towards the later stages of a charging operation and during overcharge, combines far more readily with the negative active material than hydrogen gas, as liberated at the negative, is able to combine with the positive active material. Accordingly and secondly, in order to prevent any undue build-up of hydrogen, it is known practice to adjust the ratio of negative capacity to positive capacity so as to ensure the preferential liberation of oxygen. This gas, when evolved, then combines with the negative active material whereby the negative electrode never becomes fully charged and no hydrogen is evolved from it.

However in such arrangements, the actual amount of electrolyte employed is a very critical factor, involving a tedious and lengthy procedure during the manufacture of the cell. The inter-plate pressure and quality of the separator material are similarly critical factors on which the successful operation of the cell depends. If these factors are not exactly right the cell may rapidly deteriorate in service, due, for example, to "drying out."

Furthermore, such arrangements do not overcome the problem of gases evolved during "reversal." When reversal occurs, oxygen gas is liable to be evolved at the negative plates of the reversed cell and hydrogen gas at its positive plates, that is opposite to what occurs on overcharge. Neither of the active materials of the normal positive and negative plates, in their discharged states, are capable of taking up or absorbing either hydrogen or oxygen by direct chemical combination therewith, so that if such reversal does occur a rapid and dangerous build-up of internal gas pressure is liable to result in the reversed cell.

To overcome this difficulty it has been proposed to include special additives in the plates, and in particular to include in one plate a material normally included in the plates of opposite polarity, known as anti-polar material. Such material may form a substantial proportion of the weight and bulk of the plate and contributes nothing to its electrical performance.

The provision of gas cavities in accordance with the present invention appears to prevent dangerous build-up of gas pressure both during overcharge and during reversal, and achieves this without the addition of any special materials and with little or no reduction of the effective area of the plates.

The invention may be performed in various ways but certain specific embodiments will be described by way of example with reference to the accompanying drawings, in which.

Figure 1:
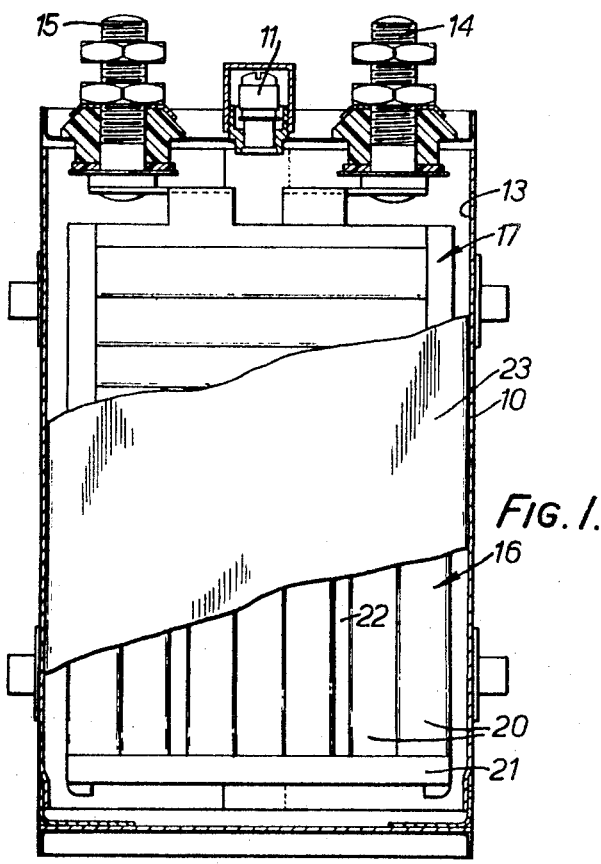
FIGURE 1 is a sectional elevation of an alkaline cell having electrodes of pocket type, progressively broken away to shown different layers.
Figure 2:
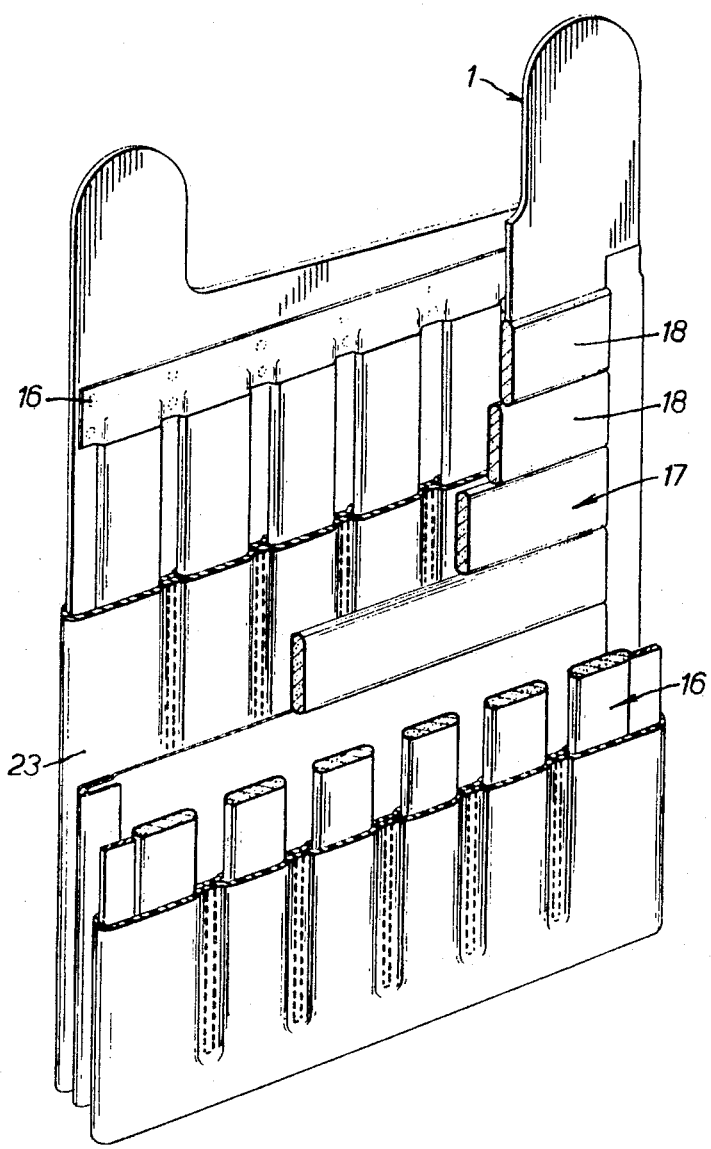
FIGURE 2 is a diagrammatic perspective of the electrodes of an arrangement differing slightly from that of FIGURE 1, and FIGURES 3 to 7 are diagrammatic views respectively of five further forms of electrode.

In the embodiment shown in FIGURES 1 and 2 a sealed nickel cadmium alkaline storage cell comprises the usual container 10 sealed by a vent plug 11 and having positive and negative terminals 14 and 15 connected respectively to positive and negative electrodes 16 and 17.

The negative electrodes 17 are of conventional pocket construction; that is the negative active material is contained in a number of perforated metal pockets 18 arranged horizontally in a supporting framework 19 and joined together edge to edge to form a continuous plate as used in conventional types of vented alkaline cells containing free electrolyte. The positive electrodes 16 are also basically of the pocket type construction, the pockets 20 being mounted either vertically or horizontally in their supporting framework 21 (vertical pockets being shown), but with each pocket spaced laterally or vertically from its neighbours to leave channels or elongated cavities 22 between them.

The negative electrodes are provided with excess negative active material whereby they are of greater capacity than the positive electrodes so that during the later stages of a charging operation, and during any overcharge, there will be a preferential liberation of oxygen gas from the positive electrode, and no liberation of hydrogen, as previously explained. Separator material of absorbent gas-permeable material, for example woven nylon or a suitable felted material, is provided in the form of a closely fitting sleeve 23 surrounding the positive plate.

The amount of electrolyte provided is limited to substantially that which will be absorbed within the pores of the electrodes and within the separator material. While there is no free electrolyte present, the exact amount of the electrolyte is not critical and it need not be limited, for example, to the absolute minimum required for the operation of the cell, that is for the necessary transfer of ions between the electrodes.

The positive and negative electrodes with the separator material in between are assembled sandwiched together in the cell but the inter-plate pressure is not critical. The construction of the positive plates provides the cavities 22, within the electrode/separator assembly, which will be substantially empty of electrolyte and within which any evolved gas or gases can collect, although there will be a film of electrolyte on or in the well surfaces of each cavity.

Oxygen gas evolved towards the end of a charging cycle and during overcharge at the positive plates can accumulate in the said cavities and have ready access through the adjacent portions of the gas-permeable separator material to the active material of the adjacent negative electrodes. Thus the cavities in the positive plate also cause local gradations in the amount of electrolyte present in the separator material, there being less electrolyte in those parts of the separator which are directly opposite such cavities than in those parts which are opposite and in contact with material parts of the plate, due to the capillary forces which arise in the latter case.

Even though, as previously mentioned, the total amount of electrolyte present is not critical and need not be reduced to the absolute minimum necessary for the normal operation of the accumulator, this local reduction in the amount of electrolyte at certain parts of the separator results in a more ready passage of the oxygen gas through those parts from the adjacent gas cavities to the negative plate. This oxygen gas combines with the charged negative active material and the water present to form cadmium hydroxide, whereby the negative electrodes can never become fully charged, so that the stage is never reached at which the evolution of hydrogen gas at this negative electrode would otherwise normally occur. With the removal of the oxygen gas and the prevention of any evolution of hydrogen gas, any undue or dangerous build-up of pressure within the sealed accumulabor is prevented, at least during any overcharging of the accumulator.

In addition it is found that an accumulator constructed as set forth above, that is with a spaced pocket type plate, can be subjected to quite severe reverse charging without any significant increase in the internal gas pressure.

The invention is not dependent on any particular theory of operation but since no additives are included in the active materials of the plates intended specifically to take up the gases which are known to be evolved during reversal, it is believed that the provision of the gas cavities promotes or assists the direct recombination of the evolved hydrogen and oxygen gases, that is as opposed to the type of combination which occurs on overcharge between the oxygen and the negative active material.

Thus it is believed that on reveral the oxygen which is then evolved at the negative plate travels over, particularly through those parts of the separator which are adjacent to the gas cavities, to the positive plate, where gas/electrolyte/metal interfaces are formed which facilitate the following electrochemical reaction, $$O_2 + 2H_2O + 4e \rightarrow 4OH^- \tag{1}$$

This reaction is one which is known to take place when nickel is present as a catalyst, for example in fuel cells, and the nickel which provides the metal interface in the present arrangement is of course that present in the active material of the positive plate or in the nickel plated surfaces of the pockets themselves.

The free hydrogen which would normally be evolved at the positive plate on reversal, that is when the positive active material is completely discharged and the current continues to flow, would be formed according to the following reaction, $$2H^+ + 2e \rightarrow H_2 \tag{2}$$

However, when the concentration of hydroxyl ions in the immediate vicinity of the positive plate is continually replenished as by reaction (1) above, reaction (2) does not take place and the hydrogen ions are steadily removed according to the following reaction to form water, $$4OH^- + 4H^+ \rightarrow 4H_2O \tag{3}$$

Thus, no free gas, either hydrogen or oxygen gas, is liberated, and there is but little rise in the internal pressure of the accumulator. It is also known that the reaction (1) above is one which is further promoted by a slightly elevated pressure, and in practice it is found that accumulators constructed in accordance with the present invention show a slight rise in internal pressure initially, which raised pressure then levels off so that there is no further increase.

As shown in FIGURE 2 each pocket of the positive plate may be spaced from the next adjacent pocket. Alternatively as shown in FIGURE 1 the pockets of the plate may be assembled in groups each including for example two or three pockets and each of such groups being spaced from the next adjacent group to form similar cavities or gas spaces. The groups of pockets may be arranged so that the individual pockets lie either vertically or horizontally in the plate.

If desired the two layers of separating material on opposite sides of a space in a positive plate may be stitched together, so as to draw them into the space. Such an arrangement, with gas cavities exposed wholly or partly to the negative plate, functions in a manner similar to that of the construction with no stitching.

In a further embodiment, not shown in the drawings but similar to those of FIGURES 1 and 2, the plate has two or more pockets or groups of pockets spaced apart and each received in a separate enevelope of the separator material. In this case the cavity between adjacent envelopes is exposed to the negative plate.

Figure 3:
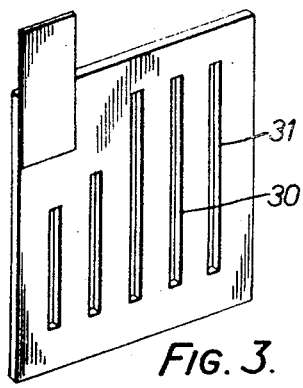
Figure 4:
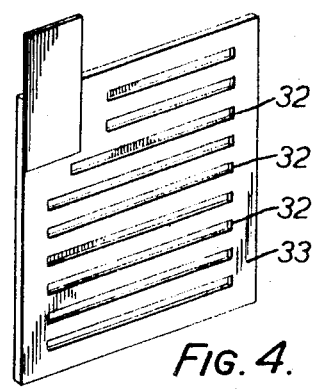

The invention is also applicable to sintered type plates and in a second embodiment shown in FIGURE 3, similar cavities or gas spaces 31 are provided in the sintered matrices of such plates 30. The said cavities or spaces can take the form of slots extending right through the matrix, as shown in FIGURE 3 or alternatively, as shown in FIGURE 4, they can consist of channels or grooves 32 cut or formed in one or each face of a plate 33 which will be adjacent to a negative electrode in the assembled cell. Similar types of absorbent gas-permeable materials are used for the separators.

Figure 5:
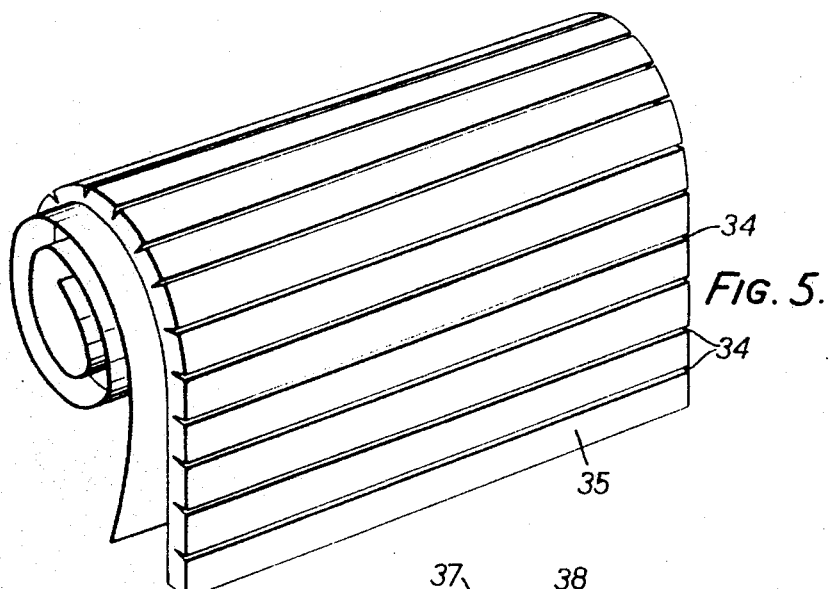

In the case of cells incorporating sintered plates of the wound electrode type, as shown in FIGURE 5 and as used for example in cylindrical accumulators, the said gas cavities are provided in the form of slits 34 cut into the sintered matrix 35 and extending through to the inner supporting gauze. Such slits also facilitate the rolling up of the initial sintered strip into the wound form when the slits also open up to provide the required gas spaces in the surface of the electrode.

Figure 6:
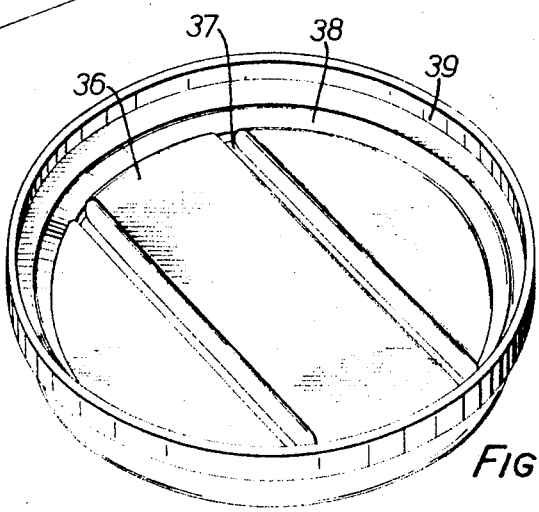

In a further embodiment shown in FIGURE 6 plates in accordance with the invention are incorporated in alkaline accumulator of the button cell type. The plates used in such button cells are sometimes conveniently punched or stamped out of pocket type plates.

FIGURE 6 shows such a construction in which, in accordance with the invention, a positive plate is punched out from an assembly having pockets 36 spaced apart to provide cavities 37 as in FIGURES 1 and 2. These are mounted in a frame 38 mounted in the positive half container 39.

Figure 7:
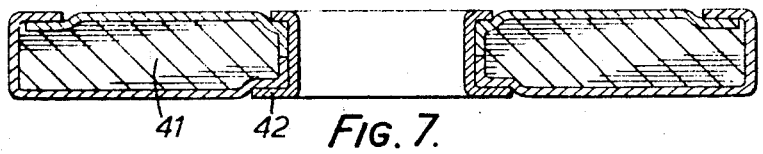

FIGURE 7 shows a button cell incorporating a pressed gauze type plate 41 for a button cell, in which the cavity is provided in the form of a hole extending centrally through the plate and reinforced by means of an eyelet 42.

Permanently sealed nickel/cadmium accumulators constructed in accordance with the present invention have a number of advantages over such sealed accumulators as proposed and known heretofore, including those including means designed specifically to prevent the evolution of free gases on both overcharge and reversal.

Firstly, sealed operation has previously demanded a very precise control or choice of electrolyte quantity, interplate pressure, separator type and quality and the relative states of charge of the positive and negative electrodes. In particular the adjustment of the electrolyte quantity has involved long periods of charging during formation to drive off excess water. With the present arrangement, the electrodes may be formed while the accumulator is flooded with electrolyte and then given a simple reverse charge to discharge fully the excess negative capacity. The cell is then merely inverted to remove the free electrolyte before final sealing.

Secondly, and with reference particularly to the problem of gases evolved during reversal, the obviation of the need to include gas consuming additives in the active materials of the electrodes, usually the positive electrode, means that the full available effective capacity of the electrodes in relation to their physical size may be utilized. Thus the amounts of the effective active materials do not have to be reduced by the inclusion of such additives, and in particular, as the effective capacity of the accumulator is very often limited by the capacity of the positive electrode, this can be of considerable consequence, particularly in the case of button cells and other smaller types of accumulators.

What I claim is my invention and desire to secure by Letters Patent is:

1. An electric storage cell of alkaline type having a gastight casing, plates of opposite polarity in said casing, absorbent gas-permeable separating material separating said plates of opposite polarity. in which at least some plates have in them gas cavities each of which is bounded partly by separator material and partly by a part of the surface of one of the plates, and a quantity to electrolyte sufficient to substantially saturate and be absorbed by the separator material while being distributed so that areas of the separator material in contact with plates of both polarities contain sufficient absorbed electrolyte to provide effective conduction, but neighboring areas exposed on at least one side to a cavity are sufficiently dry to permit the passage of gas through the separator.

2. A cell as claimed in claim 1 in which gas cavities are formed in the positive plates.

3. A cell as claimed in claim 1 in which the separator material is at least partically drawn into the gas cavity such that said cavity is exposed at least partially to the plate of opposite polarity.

4. A cell as claimed in claim 3 in which the cavity is formed by an opening extending completely through a plate, the layers of separating material on opposite sides of the opening being stitched tegether, thereby drawing them into the opening and forming cavities which are at least partially exposed to the adjacent plates of opposite polarity.

5. A cell as claimed in claim 1, in which the gas cavities are so formed as to leave at least 80% of the area of each electrode system still in contact with the moist separating material.

6. A cell as claimed in claim 1 which is of nickel-cadmium type.

7. A cell as claimed in claim 1 in which the negative electrode system has a greater charging capacity in ampere hours than the positive system 8. A cell as claimed in claim 1 including a plate of sintered type having slots extending completely through it to provide the gas cavities.

9. A cell as claimed in claim 1 having a plate of sintered type with grooves in its surface to provide the gas cavities.

10. A cell as claimed in claim 1 including a sintered plate of wound type formed with slots in its outer surface which open when the plate is wound.

11. A cell of button type as claimed in claim 1 including a plate of pressed gauze type having in it a hole occupied by an eyelet to constitute the gas cavity.

12. An electric storage cell of alkaline type having a gastight casing, plates of opposite polarity in said casing, absorbent gas-permeable separator material separating said plates of opposite polarity, in which at least some of the plates are of pocket type comprising a plurality of metallic pockets packed with active material, whereof at least one pair of adjacent pockets are spaced apart to provide between them a gas cavity bounded partly by a part of the surface of one of the plates, and a quantity of electrolyte sufficient to substantially saturate and be absorbed by the separator while being distributed so that areas of the separator material in contact with plates of both polarities contain sufficient absorbed electrolyte to provide effective conduction, but neighboring areas exposed on at least one side to a cavity are sufficiently dry to permit the passage of gas through the separator.

13. A cell as claimed in claim 12 including a separator in the form of an envelope surrounding the plate.

14. A cell as claimed in claim 13 in which opposed walls of the separator envelope are stitched together through the gas cavity or cavities.

15. A cell as claimed in claim 12 in which the pocket-type plate has at least two pockets spaced apart and each received in a separate envelope of separating material.

References Cited

UNITED STATES PATENTS

| | | | |
|---|---|---|---|
| 654,113 | 7/1900 | Heidel | 136—151 |
| 2,669,594 | 2/1954 | Andre | 136—147 X |
| 2,857,447 | 10/1958 | Lindstrom | 136—28 X |
| 2,941,022 | 6/1960 | Mandel | 136—28 X |
| 3,003,011 | 10/1961 | Artajo | 136—40 |

FOREIGN PATENTS

| | | |
|---|---|---|
| 772,594 | 4/1957 | Great Britain. |
| 946,010 | 8/1960 | Great Britain. |

WINSTON A. DOUGLAS, Primary Examiner

A. SHAPARS, Assistant Examiner

U.S. Cl. X.R.

136—13. 40. 43. 147